(12) United States Patent
Meiners

(10) Patent No.: US 12,423,828 B2
(45) Date of Patent: Sep. 23, 2025

(54) DOOR AND WINDOW DETECTION IN AN AR ENVIRONMENT

(71) Applicant: PassiveLogic, Inc., Salt Lake City, UT (US)

(72) Inventor: Justin Meiners, Murray, UT (US)

(73) Assignee: PassiveLogic, Inc., Holladay, UT (US)

( * ) Notice: Subject to any disclaimer, the term of this patent is extended or adjusted under 35 U.S.C. 154(b) by 415 days.

(21) Appl. No.: 17/982,321

(22) Filed: Nov. 7, 2022

(65) Prior Publication Data

US 2024/0153096 A1    May 9, 2024

(51) Int. Cl.
*G06T 7/13* (2017.01)
*G06T 7/62* (2017.01)
*G06T 15/06* (2011.01)
*G06V 10/98* (2022.01)

(52) U.S. Cl.
CPC ............... *G06T 7/13* (2017.01); *G06T 7/62* (2017.01); *G06T 15/06* (2013.01); *G06V 10/98* (2022.01)

(58) Field of Classification Search
USPC .......................................................... 382/100
See application file for complete search history.

(56) References Cited

U.S. PATENT DOCUMENTS

| | | | |
|---|---|---|---|
| 10,445,895 B2 | 10/2019 | Knorr et al. | |
| 10,785,413 B2 | 9/2020 | Malia et al. | |
| 11,989,834 B1 * | 5/2024 | Agarwal | G06T 19/20 |
| 2012/0280976 A1 * | 11/2012 | Chen | G06T 5/77 |
| | | | 345/419 |
| 2015/0227645 A1 | 8/2015 | Childs et al. | |
| 2018/0144555 A1 * | 5/2018 | Ford | G06T 15/20 |
| 2019/0035165 A1 * | 1/2019 | Gausebeck | G06T 7/521 |
| 2019/0197786 A1 * | 6/2019 | Molyneaux | G06V 20/20 |
| 2019/0378332 A1 * | 12/2019 | Sun | G06T 17/20 |
| 2020/0090417 A1 * | 3/2020 | Schloter | G06T 5/50 |
| 2021/0073449 A1 | 3/2021 | Segev et al. | |
| 2021/0208262 A1 | 7/2021 | Silver et al. | |
| 2021/0304509 A1 * | 9/2021 | Berkebile | G06V 40/20 |
| 2022/0375170 A1 * | 11/2022 | Osokin | G06F 30/12 |
| 2022/0406013 A1 | 12/2022 | Xiong et al. | |
| 2023/0044630 A1 * | 2/2023 | Hill | G06V 10/764 |
| 2023/0138762 A1 * | 5/2023 | Lambert | G01C 21/206 |
| | | | 382/103 |

(Continued)

OTHER PUBLICATIONS

Han, J., Liu, Y., Rong, M., Zheng, X. and Shen, S., 2023. FloorUSG: Indoor floorplan reconstruction by unifying 2D semantics and 3D geometry. ISPRS Journal of Photogrammetry and Remote Sensing, 196, pp. 490-501.

(Continued)

*Primary Examiner* — Chineyere Wills-Burns
*Assistant Examiner* — Aaron Timothy Bonansinga

(57) ABSTRACT

Various embodiments described herein relate to a method, apparatus, and a non-transitory machine-readable storage medium including one or more of the following: locating a 2D plane correlated with a 3D mesh representing a surface of a room; taking a virtual 2D picture of a 3D mesh along the 2D segment; within the virtual 2D picture, finding a hole; determining the virtual picture floor, and hole width; when the hole intersects the virtual picture floor and is at least as wide as a door width then classifying the hole as a door; else classifying the hole as a window.

20 Claims, 10 Drawing Sheets

(56) References Cited

U.S. PATENT DOCUMENTS

2023/0290069 A1* 9/2023 Su .................. G06V 20/653

OTHER PUBLICATIONS

Henry, P., Krainin, M., Herbst, E., Ren, X. and Fox, D., 2014. RGB-D mapping: Using depth cameras for dense 3D modeling of indoor environments. In Experimental robotics: The 12th international symposium on experimental robotics (pp. 477-491). Springer Berlin Heidelberg.

Majercik, A., Crass in, C., Shirley, P. and McGuire, M., 2018. A ray-box intersection algorithm and efficient dynamic voxel rendering. Journal of Computer Graphics Techniques vol. 7(3), pp. 66-81.

Alzantot et al., "CrowdInside: Automatic Construction of Indoor Floorplans", Sep. 17, 2012, DOI: 10.1145/2424321.2424335 Source: arXiv.

ARRayCastQuery, Apple Developer Documentation Kit, copyright 2021, https://developer.apple.com/documentation/arkit/arraycastquery, last accessed Dec. 15, 2021.

ARRaycastResult, Apple Developer Documentation Kit, copyright 2021, https://developer.apple.com/documentation/arkit/arraycastresult, last accessed Dec. 15, 2021.

Larsson et al., A study on the use of ARKit to extract and geo-reference floor plans, Linköplings universitet, 2021.

Raycast(_:), Apple Developer Documentation Kit, copyright 2021, https://developer.apple.com/documentation/arkit/arsession/3132065-raycast/t, last accessed Dec. 15, 2021.

Scratchapixel 2.0, Ray Tracing: Rendering a Triangle, copyright 2016-2021, https://www.scratchapixel.com/lessons/3d-basic-rendering/ray-tracing-rendering-a-triangle, last viewed Dec. 15, 2021.

Yuan et al., "Finding the Best-Fit Bounding-Boxes", International Workshop on Document Analysis Systems, Springer, Berlin Germany.

Zisserman, "Lecture 2 The SVM Classifier", Oxford UK.

PCT Written Opinion of the International Search Authority, 2024-12022.

* cited by examiner

DOOR AND WINDOW DETECTION IN AN AR ENVIRONMENT

FIELD OF INVENTION

Various embodiments described herein relate to augmented reality environments, and more specifically, but not exclusively, to detecting features such as holes, doors and windows in an AR environment.

BACKGROUND

Three-dimensional (3D) images cannot be directly projected onto two-dimensional (2D) images of open windows and doors because there is no 3D image to project; an open door or an open window is empty. The same is true for actual holes within a face. Therefore, open doors and windows within 3D systems often cannot be detected. It would be of use to be able to accurately characterize features such as holes, doors and windows within 2D and 3D systems.

SUMMARY

This summary is provided to introduce a selection of concepts in a simplified form that are further described below in the Detailed Description section. This summary does not identify required or essential features of the claimed subject matter. The innovation is defined with claims, and to the extent this Summary conflicts with the claims, the claims should prevail.

Various embodiments described herein provide a method performed by a processor for finding features within a 3D mesh, the method including: locating a 2D segment correlated with a 3D mesh representing a surface of a room; taking a virtual 2D picture of the 3D mesh along the 2D segment; within the virtual 2D picture, finding a hole; finding a location of the hole within the 3D mesh; offsetting the location of the hole within the 3D mesh, creating a hole offset; casting rays from a middle of the hole offset into the 3D mesh; determining if the cast rays have hit the back side of a face within the 3D mesh; when the cast rays have hit one or fewer back sides of faces then classifying the hole as an error in the 3D mesh; when the cast rays have hit greater than one back sides of faces then: determining vertical picture floor, and determining hole width; when the hole intersects the vertical picture floor and when the hole is at least as wide as a door width then classifying the hole as a door; and when the hole does not intersect the vertical picture floor or when the hole is not at least as wide as the door width, then classifying the hole as a window.

Various embodiments described herein create the 3D mesh using 3D depth scanner and a 2D camera working in tandem.

Various embodiments described herein take a 2D virtual picture of a 3D mesh by copying a slice of the 3D mesh with a y axis of the 2D virtual picture being a length of the 2D segment and an X axis of the 2D virtual picture being a value derived from the 3D mesh.

Various embodiments are described wherein the slice of the 3D mesh is defined as 1 pixel wide.

Various embodiments are described wherein the X axis being a value derived from the 3D mesh includes finding a minimum value in the 3D mesh along the 2D segment.

Various embodiments are described wherein the X axis being a value derived from the 3D mesh further includes finding a maximum value in the 3D mesh along the 2D segment.

Various embodiments described herein include locating faces in the 3D mesh whose normal vector is opposite to gravity, and recording the area of the faces in the 3D mesh whose normal vector is opposite to gravity as an up area.

Various embodiments are described wherein locating faces in the 3D mesh whose normal vector is aligned with gravity, and recording area of the faces in the 3D mesh whose normal vector is aligned with gravity as a down area.

Various embodiments are described wherein creating a histogram of the up area at different heights, and creating a histogram of the down area at different heights.

Various embodiments are described wherein finding height of a tallest histogram in the up area is declared to be a ceiling.

Various embodiments are described wherein finding height of a tallest histogram in the down area is declaring as a determined floor.

Various embodiments are described wherein the X axis is the height of the tallest histogram in the up area.

Various embodiments are described wherein the hole intersecting the virtual vertical picture floor includes the hole intersecting the determined floor.

Various embodiments are described herein relate to a system for locating shapes within a 3D mesh the system including: a processor in communication with a memory storing a 3D mesh, the processor configured to: locate a 2D segment correlated with a 3D mesh representing a surface of a room; take a virtual 2D picture of the 3D mesh along the 2D segment; within the virtual 2D picture, find a hole; find a location of the hole within the 3D mesh; offset the location of the hole within the 3D mesh, creating a hole offset; cast rays from a middle of the hole offset into the 3D mesh; determine if the cast rays have hit a back side of a face within the 3D mesh; when the cast rays have hit the back side of one or fewer faces within the 3D mesh then classifying the hole as an error in the 3D mesh; when the cast rays have hit the back side of more than face within the 3D mesh then: determine virtual picture floor, and determine hole width; when the hole intersects the virtual picture floor at least as wide as a door width then classify the hole as a door; and when the hole does not intersect the vertical virtual picture floor or is not at least as wide as the door width, then classify the hole as a window.

Various embodiments are described wherein six rays are cast.

Various embodiments are described wherein the six cast rays are cast in six cardinal directions.

Various embodiments are described herein relate to a non-transitory machine-readable storage medium encoded with instructions for execution by a processor for determining holes and windows within a 3D mesh, the non-transitory machine-readable storage medium including: instructions for locating a 2D segment correlated with a 3D mesh representing a surface of a room; instructions for taking a virtual 2D picture of the 3D mesh along the 2D segment;

instructions for finding a hole within the virtual 2D picture; instructions for find a location of the hole within the 3D mesh; instructions for offsetting the location of the hole within the 3D mesh, creating a hole offset; instructions for casting rays from a middle of the hole offset into the 3D mesh; instructions for determining if the cast rays have hit a back side of a face within the 3D mesh; instructions for classifying the hole as an error in the 3D mesh when the cast rays have hit a back side of one or fewer faces; instructions for determining virtual picture floor and determining hole width when the cast rays have hither back side of more than 1 face; and instructions for classifying the hole as a door when the hole intersects the virtual picture floor and when the hole is at least as wide as a door width.

Various embodiments are described wherein the 3D mesh is created using 3D depth scanner and a 2D camera working in tandem.

Various embodiments are described wherein the depth scanner is a LiDAR device.

Various embodiments are described wherein instructions are included for classifying the hole as a window when the hole does not intersect the virtual picture floor or when the hole is not at least as wide as the door width.

Various embodiments Maybe it's worth explaining more about the 2D segment correlated to the walls.

What this invention is most generally about is detecting features that lie in 3D planes of the model. There are a variety of ways to extract or find those 3D planes.

In our particular application we use our prior invention which helps us extract a 2D floor plan. The walls are represented in that floor plan as 2D segments of a polygon. But, we basically just turn those into a 3D plane that matches the wall for this feature detection step.

For example, we could also use this invention to detect skylights in a ceiling, instead of a wall.

BRIEF DESCRIPTION OF THE FIGURES

In order to better understand various example embodiments, reference is made to the accompanying drawings, wherein:

FIG. 11b corresponds to a virtual 2D picture of the 3D mesh shown with reference to FIG. 11a.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as use herein, refers to a non-exclusive "or" (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Augmented Reality AR/LiDAR (Augmented Reality/Light Detection And Ranging) allows one to capture a a detailed cloud of 3D points, with reasonable accuracy and precision, in real-time. A 3D point cloud, or 3D mesh of the environment, may be captured using a depth measuring system/depth scanner, such as LiDAR, simultaneously with the same environment being captured in a 2D Artificial Reality (AR) environment. This cloud of 3D points and 2D points may be structured to create a 3D mesh cloud. Within this 3D mesh cloud, there are applications that detect closed windows and doors. But such detection is only done with errors. One type of error is that the classification made is overinclusive to a degree that makes the detection very difficult to use. For example, when an outline of a closed door or window is detected in 2D and then projected onto a 3D face, or detected in 3D initially, the 2D door or window classification is projected beyond the original face into the space behind, classifying it as a door or window also rather than as part of the room behind. Not only does this mischaracterize portions of the space behind the doors incorrectly, but as the 3D perspective changes, what is "behind" the object classified as a door or window changes too. This specific mischaracterization may be caused when a projection point and image point do not converge.

Figure 1:
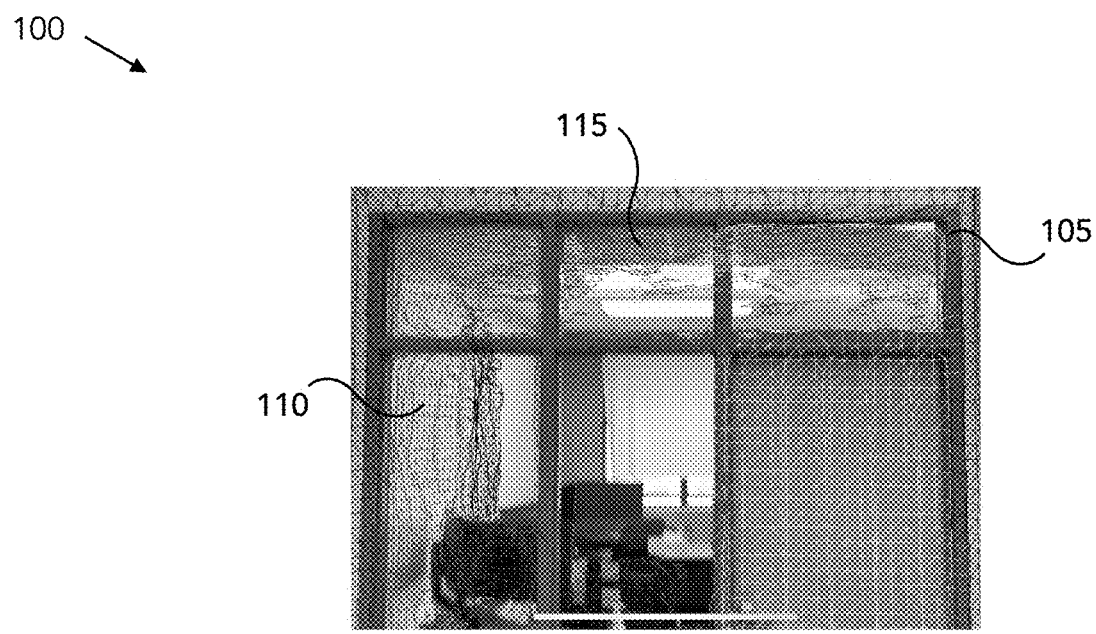
FIG. 1 illustrates an example 100 of a 3D mesh structure overlaid over an existing structure where the mesh structure extends a window classification into the room behind it.
Figure 2:
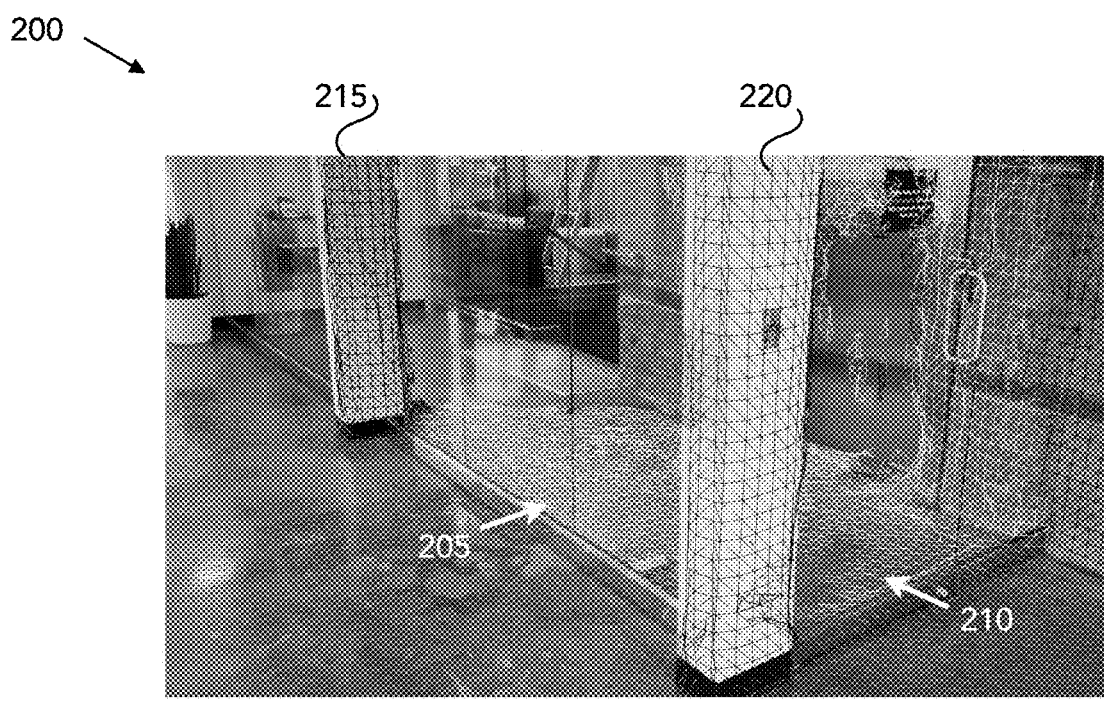
FIG. 2 illustrates an example of an existing 3D mesh structure where a door classification extends inside a glass structure.
Figure 3:
FIG. 3 illustrates a different view of the 3D mesh structure of FIG. 2.

FIG. 1 illustrates an example 100 of a 3D mesh structure overlaid over an existing structure where the mesh structure incorrectly extends a window classification into the room behind it. The window 105 has been defined as a window, whose classification is marked by a red mesh that can be seen incorrectly extending into the left wall of the room 110 and into the ceiling 115. FIG. 2 illustrates an example of an existing 3D mesh structure 200 where a door classification (yellow mesh) 205, 210 incorrectly extends inside a glass structure bounded by the pillars 215, 220. FIG. 3 illustrates an example of the same 3D mesh structure 300 viewed from a different angle where it can be seen that the incorrect yellow mesh door classification 310 has been greatly reduced, with a large part of the formerly yellow mesh door structure now being wrongly classified as a window, as indicated by the red mesh 305. This unstable classification leads to problems as not only are the classifications incorrect, but the classifications can change unexpectedly and unjustifiably.

As another problem, currently, when a mesh as generated has a hole in it, the hole is most likely either not classified at all or is misclassified. An example may be a 3D mesh generated by a bookshelf against a wall. A slice of the 3D mesh around the wall may show a hole in the image where the bookshelf projects into the room, but the hole is caused by the bookshelf obscuring the wall—the mesh forms around the bookshelf and not the wall. This same phenomenon is also shown with regard to the the shelves shown in FIG. 11a at 1105a and 1110a. In the wall image shown in 1100b, there are holes 1105b and 1110b in the images because the 3D mesh formed around the shelves and not at the wall, so the slice 1100b shows holes where the shelves protrude into the space.

Discerning the difference between a miscalculated hole and an actual void in the representative object so far has been a difficult image processing problem with no clear solution. Being unable to correctly classify holes leads to faces that are not only too noisy, containing many features that may not actually exist, but are also unreliable to trust as to the location of actual features such as windows, doors, and voids.

To address these and other aspects of detection and classification within AR frameworks, various embodiments described herein relate to accurately classifying objects that may appear as holes within 2D and 3D and mixed 2D/3D frameworks.

Figure 4:
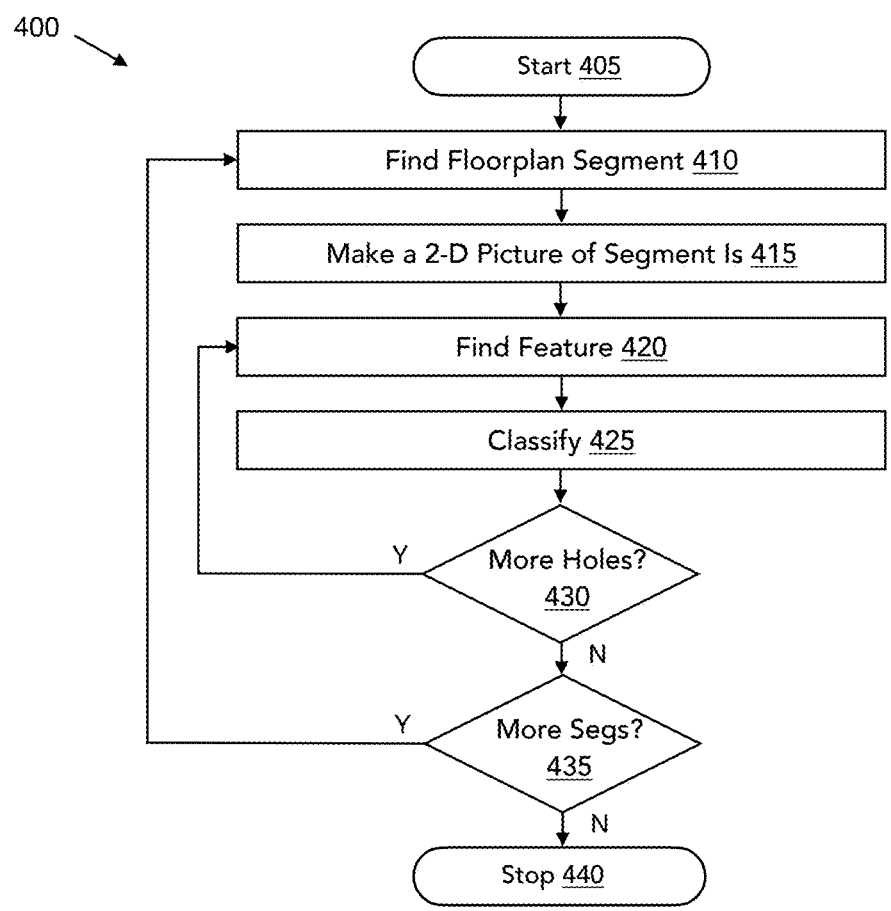
FIG. 4 illustrates an overview of an example method for correctly classifying windows, doors, and voids in 2D, 3D and combined meshes.

Generally, embodiments disclosed herein discuss detecting features that lie in 3D planes of the model. There are a variety of ways to extract these 3D planes. FIG. 4 at 410 describes one way to find 3D planes which might have features that should be classified. Other methods of extracting 3D planes are also envisioned.

FIG. 4 illustrates an overview 400 of an example method for correctly classifying features. in 2D, 3D and combined meshes. In various embodiments, the method 400 may be performed by a processor 520 within a scanner, e.g., 630, a distributed system, a single processor, a single controller, multiple controllers within a distributed system, etc. Various alternative arrangements and methods of detecting features will be apparent.

The method begins at step 405 and proceeds to 410 where an existing 3D mesh is divided into segments, (which may be a room surface plane, such as a join between a wall and a ceiling) that represent a floorplan, the segments having an associated room surface, such as a wall, ceiling, or floor. This is described in greater detail with reference to FIGS. 9-14. One of these segments is selected. Then, at step 415, a 2D picture is taken of the 3D mesh version of the room surface represented by the segment at the segment location. This is described in greater detail with reference to FIGS. 11a and 11b. Continuing at operation 420, the 2D picture is examined to find a feature. When a feature is located, at operation 425, it is classified. The classification may be window, door, hole, or other feature. At decision point 430, the 2D picture is examined for more holes. The process iteratively repeats starting at operation 420 until there are no more holes found, at which point, at decision point 435, it is determined if there is another floorplan segment or surface plane. If so, then process interactively repeats starting at operation 410 until there are no more segments. Then, at operation 440, the method stops.

Figure 5:
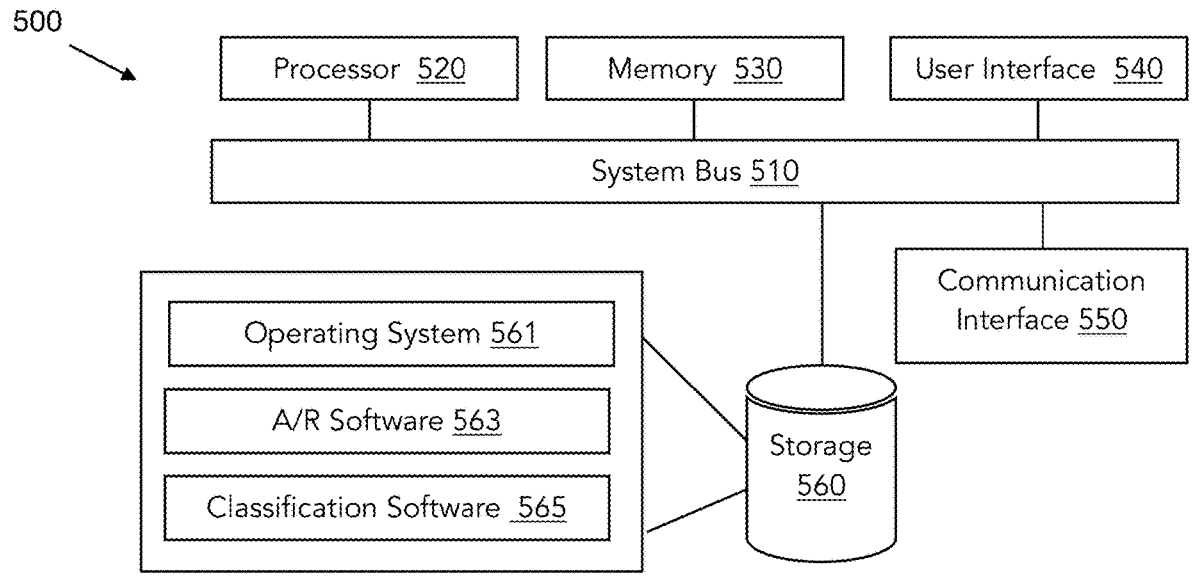
FIG. 5 illustrates an exemplary hardware diagram for implementing a controller/hardware device.

FIG. 5 illustrates an exemplary hardware diagram 500 for implementing a controller/hardware device. As shown, the device 500 includes a processor 520, memory 530, user interface 540, communication interface 550, and storage 560 interconnected via one or more system buses 510. It will be understood that FIG. 5 constitutes, in some respects, an abstraction and that the actual organization of the components of the device 500 may be more complex than illustrated.

The processor 520 may be any hardware device capable of executing instructions stored in memory 530 or storage 560 or otherwise processing data. As such, the processor may include a microprocessor, field programmable gate array (FPGA), application-specific integrated circuit (ASIC), a vector processor, or any other device capable of performing the logic functions described herein. In a multi-processing system, multiple processing units execute machine-executable instructions to increase processing power and as such multiple processors, as well as multiple elements with a processor, can be running simultaneously. It should be apparent, however, that in various embodiments elements belonging to the processor 520 may not be physically co-resident. For example, multiple processors may be attached to boards that are physically separate from each other.

The memory 530 may include various memories such as, for example L1, L2, or L3 cache or system memory. As such, the memory 530 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 540 may include one or more devices for enabling communication with a user such as an administrator. For example, the user interface 540 may include a display and a keyboard for receiving user commands. The user interface 540 may also include a mouse. In some embodiments, the user interface 540 may include a command line interface or graphical user interface that may be presented to a remote terminal via the communication interface 550.

The communication interface 550 may include one or more devices for enabling communication with other hardware devices. For example, the communication interface 550 may include a network interface card (NIC) configured to communicate according to the Ethernet protocol. The communication interface 550 may include a bluetooth transmitter, receiver, antenna and specialized control chips. Additionally, the communication interface 550 may implement a TCP/IP stack for communication according to the TCP/IP protocols. The communication interface may also include various alternative or additional hardware or configurations for the communication interface 550 as will be apparent.

The storage 560 may include one or more machine-readable storage media such as read-only memory (ROM), random-access memory (RAM), magnetic disk storage media, optical storage media, flash-memory devices, or similar storage media. In various embodiments, the storage 560 may store instructions for execution by the processor 520 or data upon with the processor 520 may operate. For example, the storage 560 may store a base operating system 561 for controlling various basic operations of the hardware 500. The storage 560 may also store A/R software 563 which may be able to develop 3D meshes using 2D and 3D inputs. Also included in storage 560 may be classification software 565 that classifies objects within the 3D mesh that refer to windows, doors, voids, and other objects that may be represented within a 3D mesh.

It will be apparent that various information described as stored in the storage 560 may be additionally or alternatively stored in the memory 530. In this respect, the memory 530 may also be considered to constitute a "storage device" and the storage 560 may be considered a "memory." Various other arrangements will be apparent. Further, the memory 530 and storage 560 may both be considered to be "non-transitory machine-readable media." As used herein, the term "non-transitory" will be understood to exclude transitory signals but to include all forms of storage, including both volatile and non-volatile memories.

While the host device 500 is shown as including one of each described component, the various components may be duplicated in various embodiments. For example, the processor 520 may include multiple microprocessors that are configured to independently execute the methods described herein or are configured to perform steps or subroutines of the methods described herein such that the multiple processors cooperate to achieve the functionality described herein. Further, where the device 500 is implemented in a cloud computing system, the various hardware components may belong to separate physical systems. For example, the processor 520 may include a first processor in a first server and a second processor in a second server.

Figure 6:
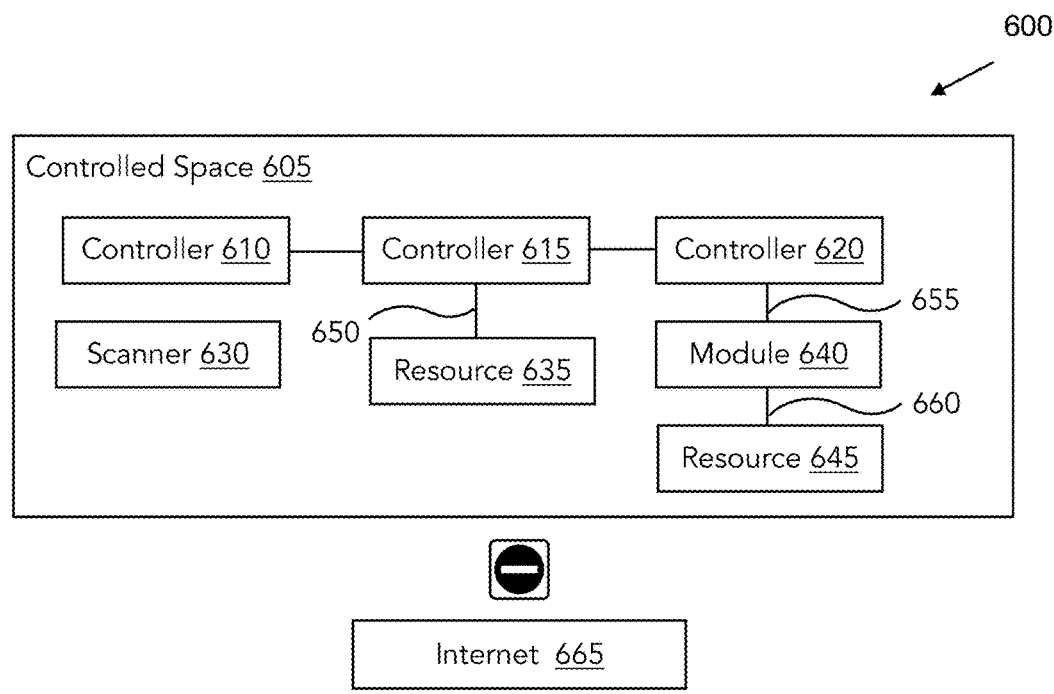
FIG. 6 illustrates an example of a distributed computing system that may be used in implementations described herein.

FIG. 6 illustrates an example of a distributed computing system 600 that may be used in implementations described herein. A controlled space 605 may have multiple controllers (e.g., 610, 615, 620) within the space. Each of these controllers may contain some or all of the controller/hardware system shown with reference to FIG. 5 at 500. In some embodiments, the distributed computing system may run without access to the internet 665. In some embodiments, the distributed computing system may be run as an edge computing system with one or more edge devices that allow selective connections to the internet through them. In some embodiments, the distributed computing system allows applications (e.g., software) to run on multiple controllers (e.g., some combination of 610, 615, 620) simultaneously or serially, or a combination of both. The same application may run in concurrent processes on different processors, on different controllers, etc., such that users perceive the controllers as an integrated whole. This may provide redundancy, as when components fail, other components can seamlessly take over their roles. These distributed applications may be stored and run completely within the controlled space 605 without access to external internet 665. This may allow low latency, as. e.g., processing time is not affected by cloud/internet lag time. In some instances, one or more controllers 610, 615, 620 may connect to the internet 665. The connection may be siloed off from the bulk of the computing power in the controlled space 605.

The distributed computing system may run as a client-server system with one controller being designated as the master-server. The distributed system may be run as a peer-to-peer network, a virtual server may be used, etc. The application may be split into a number of pieces, e.g., chunked, between the controllers. The controllers may be self-federating; e.g., they self-assemble into a network. Controllers may vote to elect a leader. If the network is damaged, such that the current leader can no longer lead, a new leader may be elected by at least some of the undamaged controllers. This provides built-in redundancy. The leader controller may determine how to divide the work load among the controllers. A scanner 630 (described in greater detail with reference to FIGS. 7a and 7b) may also be included. This scanner may be used to build 2D and 3D meshes The controller may have one or more connectors that connect 650 to a resource 635. The controller may have connectors that connect to module 640 through module connectors 655. The module may have resource connectors 660, that are directly wired to a resource 645. The resources 635, 645 may be any sort of resource, without limitation, that can be wired to a controller. For example, without limitation, resources may be HVAC resources, such as heating, cooling, and storing resources, entertainment resources, such as sound systems and TV's, lighting resources, safety resources, such as door locks, etc. The controller 620 may control a resource 645 though the resource connectors 660 communicating to the module connectors 655, and vice-versa.

This allows the controller to control the resource, such as turning a heater on, through the module connector 655 passing information through the module 640. The message is then passed through resource connectors 660 to the resource 645, such as, e.g., telling a heater to turn on. A resource 635 may be wired through one or more resource connectors 650 directly to a controller 615. In some embodiments, a resource may be wired to one or more modules. In certain embodiments, a controller may not control a specific resource but infers its state from scanners, sensors, the state of other resources, and so forth. In some embodiments, the controllers, e.g., 610, 615, 620 run without use of the internet 665. This allows for a much more secure system, as the system 600 should be impervious to internet attacks, such as DDoS attacks, zero day exploits, etc.

Figure 7A:
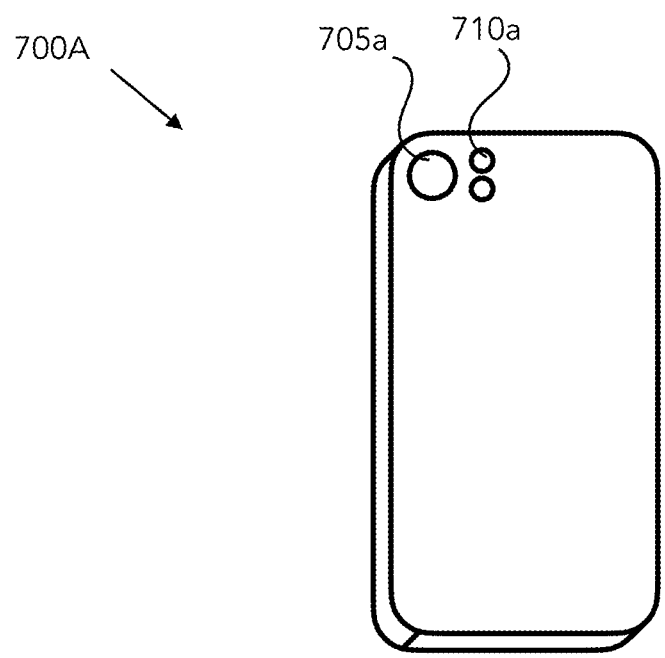
FIGS. 7A and 7B are illustrations of examples of the back and front of an exemplary scanner that may be used to develop 2D and 3D meshes that may be used with implementations described herein.
Figure 7B:
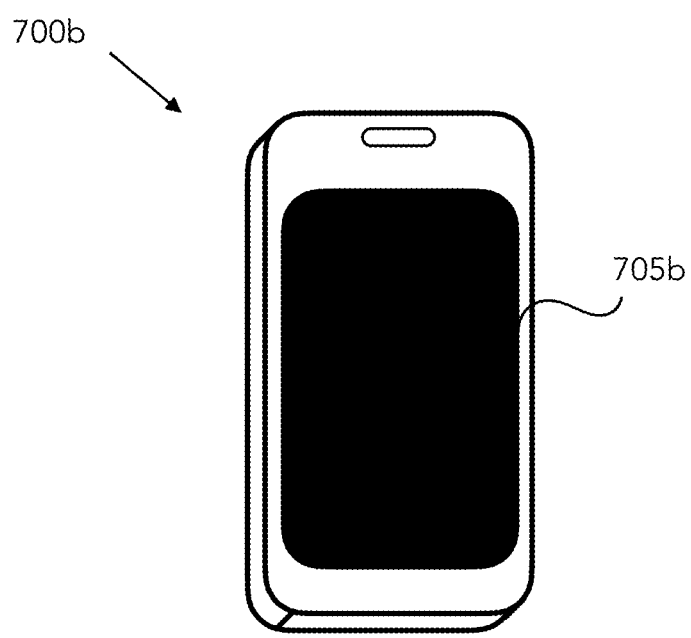

FIGS. 7A at 700A and 7B at 700B are the back and front of an exemplary scanner, such as the scanner 630 that may be used in some described embodiments to scan and create a 3D mesh using both 2D and 3D scanners. This scanner may incorporate some or all of the elements described with reference to the exemplary hardware diagram 500. That is, the system as described in FIG. 5 may be implemented using a mobile phone 700a or another portable computing device with a 2D camera 705a and a depth scanner 710a. In some implementations, this depth scanner may be a LiDAR device. In some implementations, the system includes a user input device. This user input/output device may be a touchscreen 705b. In embodiments, a 3D depth scanner and the 2D camera may work in tandem to create a 3D mesh. Further there may be a correlation between a picture taken by the 2D camera and a 3D mesh created by a depth scanner, such that a location found within the 2D camera picture may correspond to a location within the 3D mesh.

Figure 8:
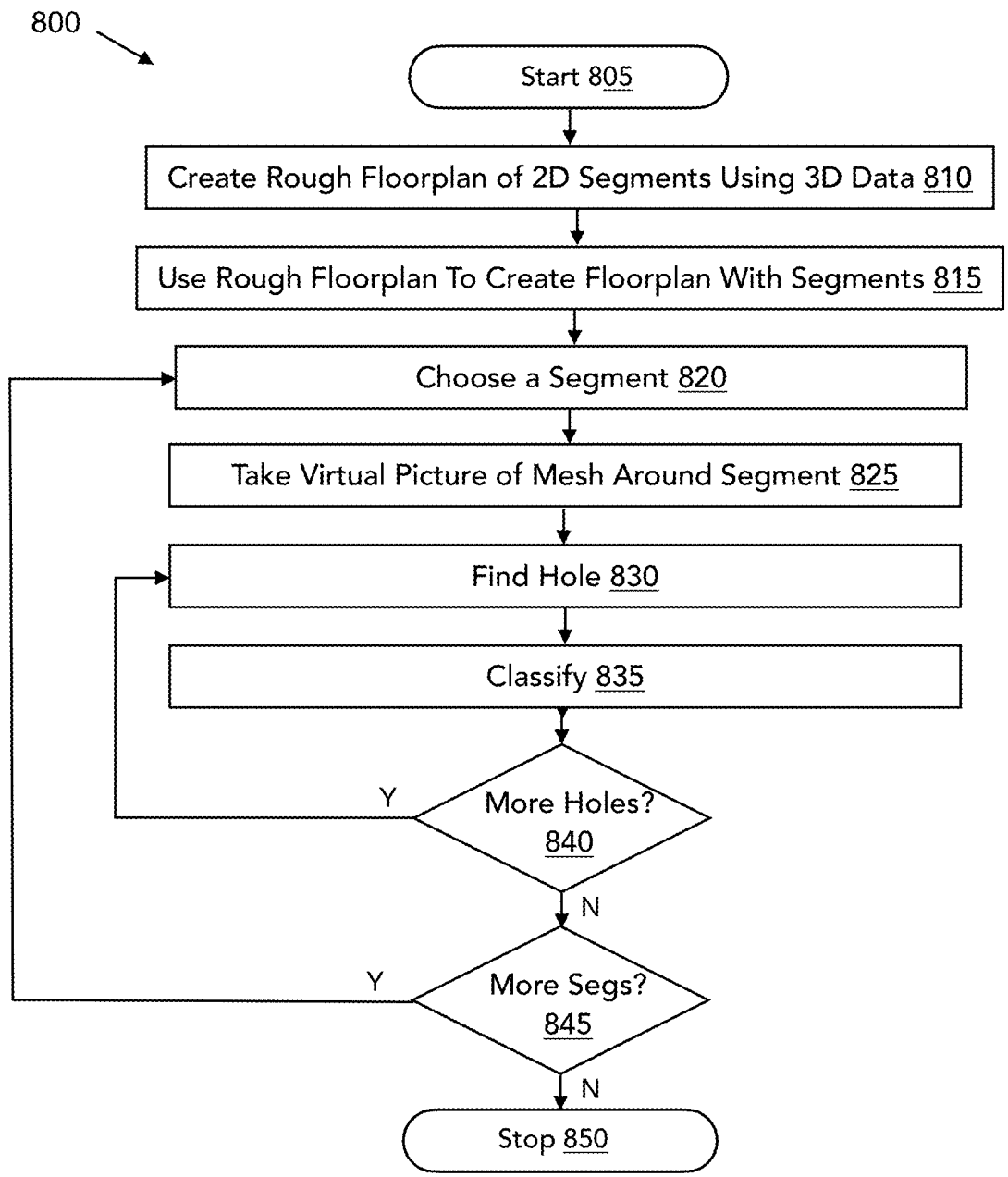
FIG. 8 illustrates an example of a method for detecting features in an AR environment.

FIG. 8 illustrates an example of a method 800 for detecting features in an AR environment. In various embodiments, the method 800 may be performed by a processor 520 within a scanner, e.g., 630, a distributed system, a single processor, a single controller, etc. Various alternative arrangements and methods of detecting features will be apparent.

The method begins at step 805, and then continues to step 810 where a rough floor plan may be created by using floor plan detection such as a depth scanner. This depth scanner may be an augmented Reality AR/LiDAR (Augmented Reality/Light Detection And Ranging) device. This detection may allow capture of a detailed cloud of 3D points, with reasonable accuracy and precision. Such a detection may occur in real-time, by walking through a building and surveying the area with a camera/depth scanner device, e.g., such as shown with reference to 630 at FIG. 6 and with reference to FIGS. 7a and 7b. This cloud of 3D points augmented by 2D points may be automatically structured to create a 3D mesh. An example of such a cloud of 3D points may found with reference to FIG. 10 at 1000. Once a 3D mesh has been created, a floor plan may be built up room surface by room surface using a user-held depth scanner device with a display screen, such as that described with reference to FIGS. 7a and 7b. In embodiments, a user scans the room with a handheld scanner, putting user marks on the display screen that show room surface locations. When a new room surface is determined by the user mark, depth scanner calculations, and the heuristic, the user is given a look at the current floor plan. When the floor plan shows an error, the user may place another mark to more exactly specify a room surface location. Such systems and methods to extract a series of segments that can be understood to be room surfaces are described in patent application Ser. No. 17/459,084, filed on Sep. 15, 2021, hereby incorporated by reference herein in full for all purposes. To improve an imperfect floorplan scan, the floor plan may be built up room surface by room surface using a user-held depth scanner device with a display screen, such as that described with reference to FIGS. 7a and 7b. A user scans the room, and puts marks on the display screen that show room surface locations. When a new room surface is determined by the user mark, depth scanner calculations, and the heuristic, the user is given a look at the current floor plan. When the floor plan shows an error, the user may place another mark to more exactly specify a room surface location. Such systems and methods to extract a floor plan are described in patent application Ser. No. 17/855,513, filed on Jun. 30, 2022, hereby incorporated by reference herein in full for all purposes.

Figure 9:
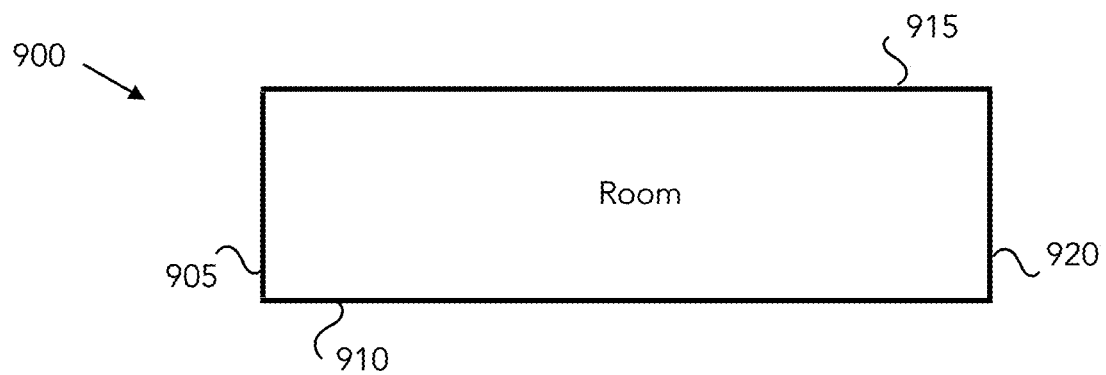
FIG. 9 is an illustration of an example for our segments defining the floorplan of a room that may be used in methods and systems presented herein.
Figure 10:
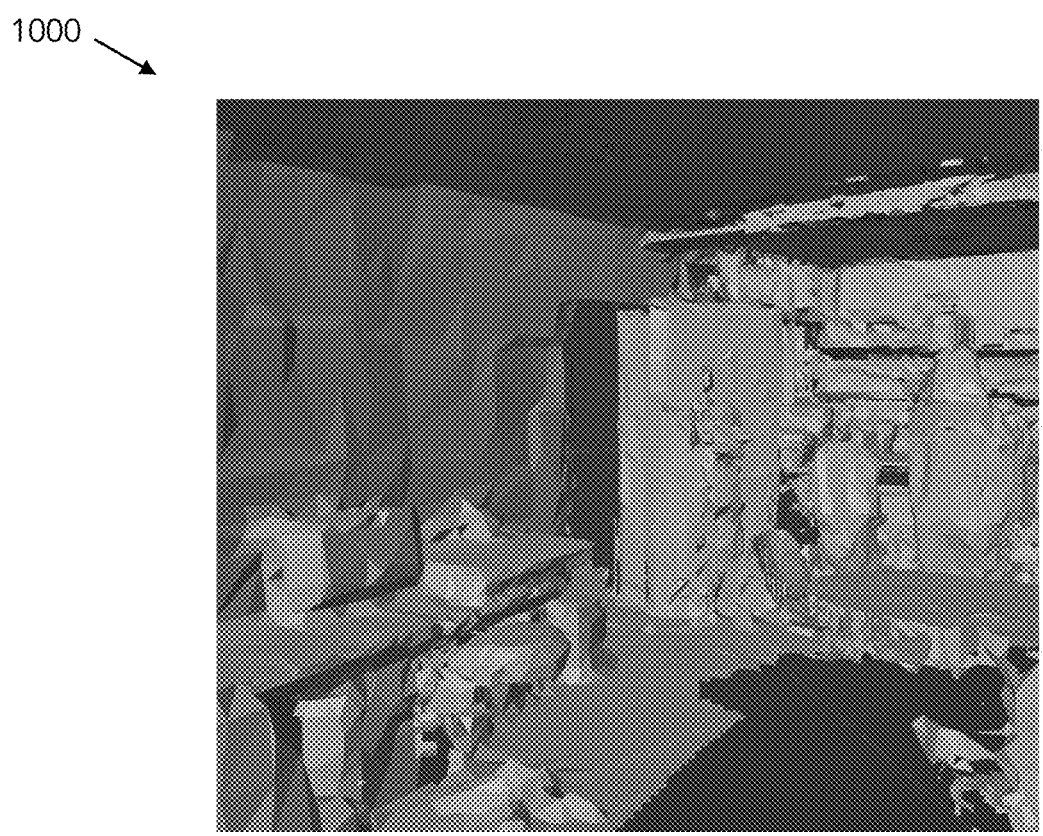
FIG. 10 is an example mesh cloud that may be used to define a portion of a room in methods and systems presented herein.
Figure 11A:
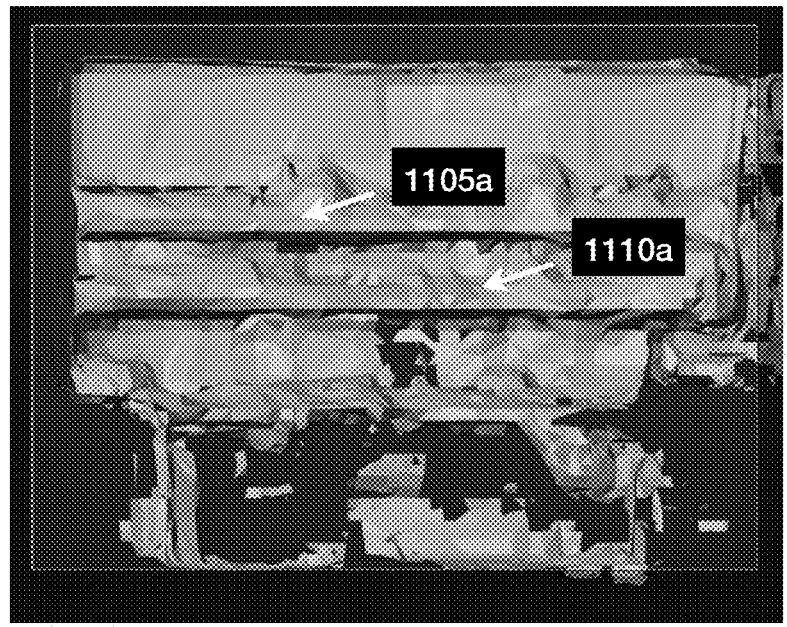
FIG. 11a corresponds to a 3D mesh that encloses the room surface referenced by a segment in FIG. 9.
Figure 11B:
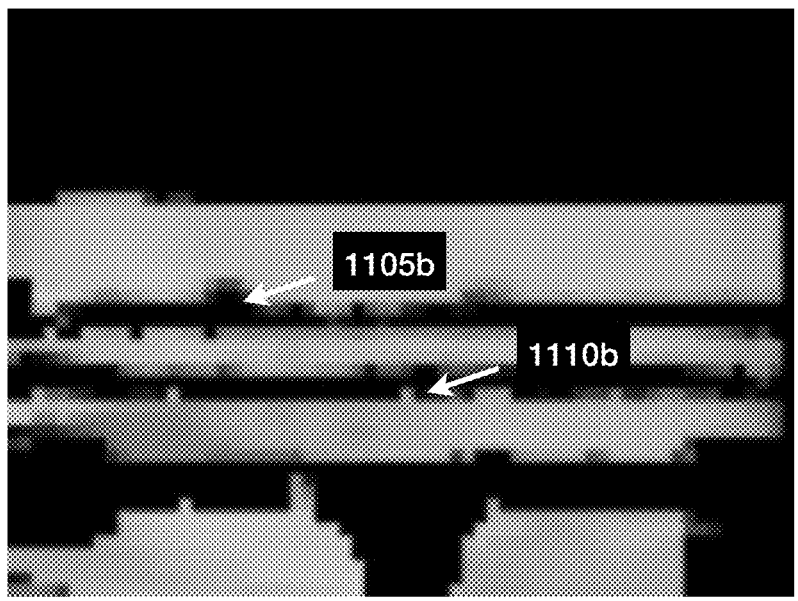
Figure 12:
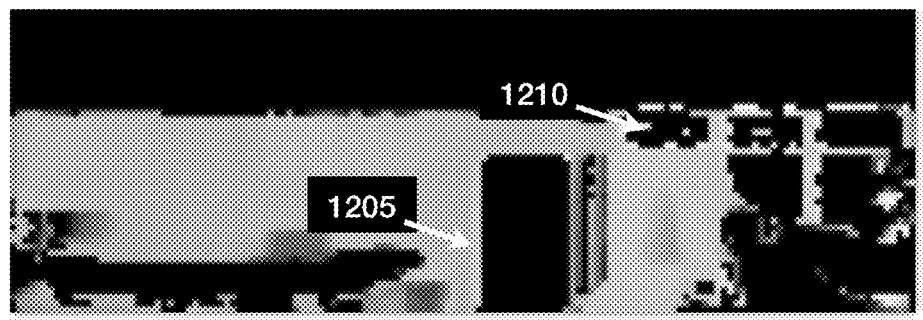
FIGS. 12-14 correspond to virtual 2D pictures of room surfaces represented by segments.
Figure 13:
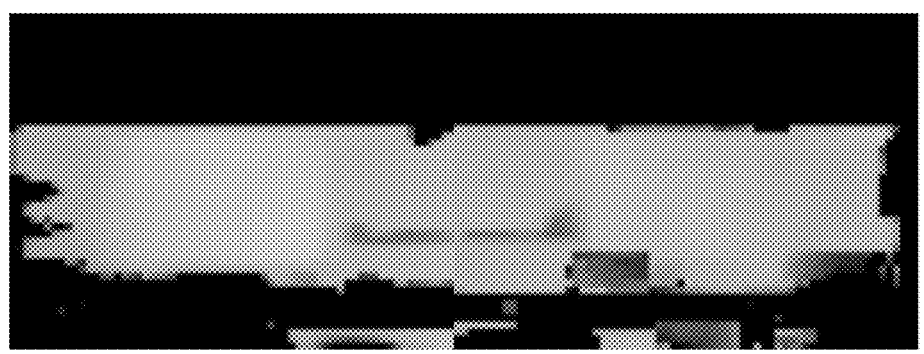
Figure 14:

In some embodiments, rather than segments of a floor plan, a portion of the 3D mesh cropped to a plane may be used. For example, a ceiling may have a skylight to be classified. In such a case, a wall-to-ceiling segment may be used. At operation 815, the accurate floorplan described with reference to operation 810 is used to create a floorplan made out of segments. To do so, a path through the graph of segments that visits each vertex of a segment exactly once must be determined. At operation 820, a segment is chosen. FIG. 9 is an illustration of an example of four 2D segments 905, 910, 915, 920 defining the floorplan of a room 900 that may be used in methods and systems presented herein, such as those created described with reference to FIG. 8 at, e.g. 810 and 815. FIG. 10 is an example mesh cloud 1000 that defines a portion of a room, such as the room 900. This mesh cloud may also be described as a virtual world captured by the 3D depth sensor. In embodiments, this mesh is composed of vertices, also known as faces, the faces having a normal vector that is either aligned with gravity or aligned in a direction opposite to gravity. FIG. 11a corresponds to the 3D mesh that encloses the room surface referenced by segment 905. FIG. 11b corresponds to a virtual 2D picture 1100b of the mesh 1100a represented by the 2D segment 905. FIG. 12 corresponds to a virtual 2D picture 1200 of the room surface represented by the segment 910; FIG. 13 corresponds to a virtual 2D picture 1300 of the room surface represented by the 2D segment 915, and FIG. 14 corresponds to a virtual 2D picture 1400 of the room surface represented by the 2D segment 920. As an example of a segment being chosen in operation 820, the 2D segment 905 my be chosen.

At operation 825, a virtual 2D picture is taken of the mesh around the chosen plane, such as shown with reference to FIG. 11b and the surrounding text. In some embodiments, the length of the virtual 2D picture is the same as the length of the plane, but the height of the virtual 2D picture may not be obvious. In such cases, various embodiments may be used to find the height. One such embodiment is shown with reference to FIG. 17 and the surrounding text. The virtual 2D picture may also have a width. In some embodiments, the width is a meter, a foot, or some other width. in other embodiments, the virtual 2D picture may be a different width.

FIG. 11a is a mesh 3D representation of a room surface 1100a that shows a representation of hanging shelves shown 1105a, 1110a. FIG. 11b is a virtual 2D picture of this mesh representation 1100a. The 3D shelves 1105a, 1110a, now appear, at least partially, as holes 1105b,1110b. This may be because the mesh was formed around the outside of the shelves, leaving a hole at the location of the virtual 2D picture.

At operation 830, a hole is found. In some embodiments, region segmentation is used; in some embodiments, edge detection is used to find holes, in some embodiments, the virtual 2D picture is systemically examined to find locations with pixels that represent a void within them; i.e., possess a value that indicates a hole. In some embodiments, windows or doors (that may be closed) may have been detected by a different method. This value may be a range of dark values or a different range of values. In embodiments, there may be a minimum number of correlated pixels that define a hole. Multiple methods of hole detection may be used in some embodiments. Windows or doors (that may be closed) may have been detected by a different method, but here may be redefined as holes. At operation 835, the hole is classified. Hole classification is explained with more detail with reference to FIGS. 15 and 16. At decision point 840, the virtual 2D picture of the segment is iteratively checked for more holes within the chosen segment. If there are more holes found, then the method resumes at operation 830. If there are no more holes in this particular segment, then at decision point 845, it is determined if another segment exists to be checked for holes. If there are more segments, then the method resumes iteratively at operation 820. If there are no more segments, then at 850 the method stops.

Figure 15:
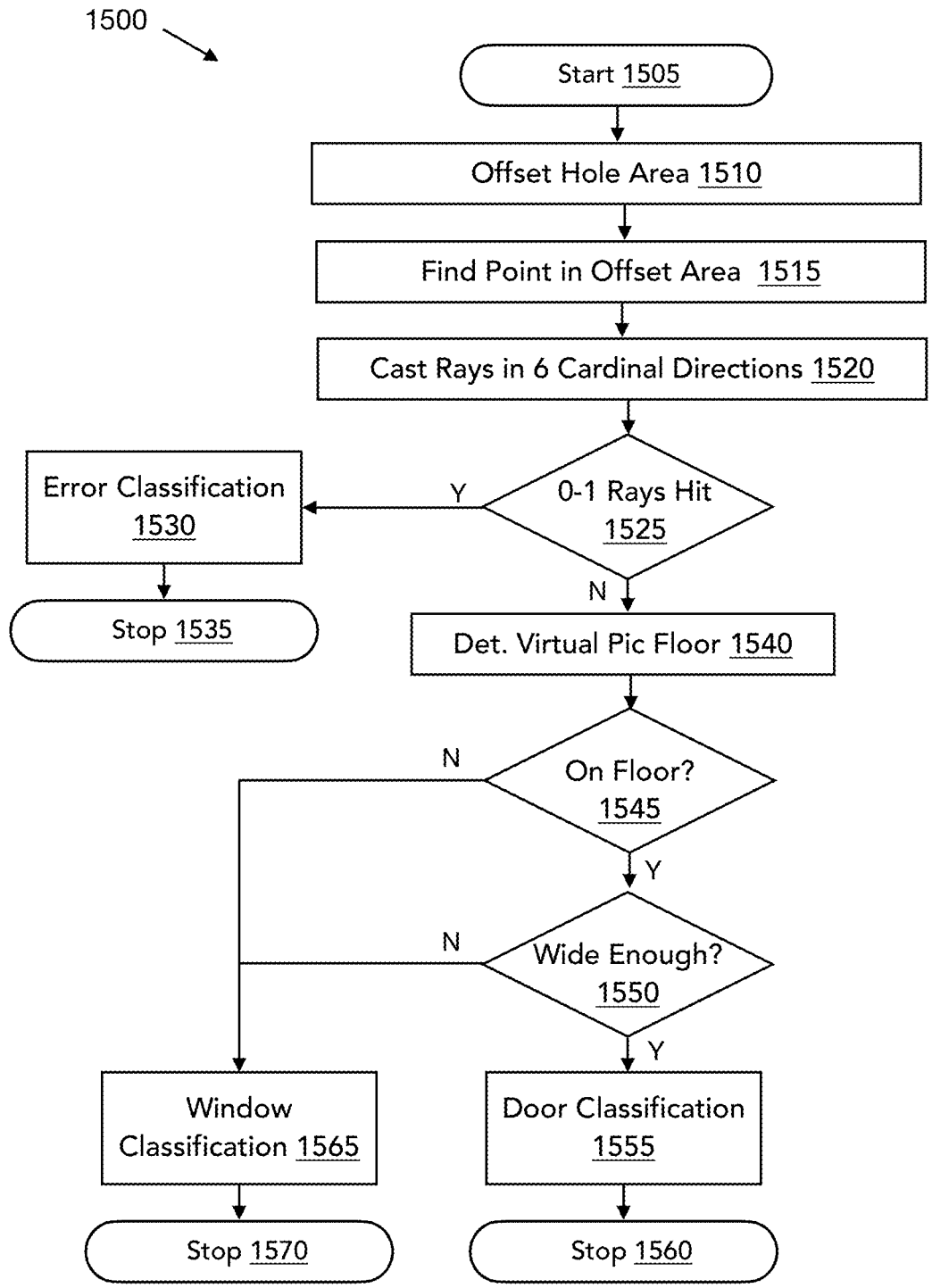
FIG. 15 illustrates an example of a method for classifying a located hole.

FIG. 15 illustrates an example of a method 1500 for classifying a located hole, e.g., such as in an AR environment. In various embodiments, the method 1500 may be performed by a processor 520 within a scanner, e.g., 630, a distributed system, a single processor, a single controller, etc. Various alternative arrangements and methods of classifying a located hole will be obvious.

The method begins at operation 1505, and then continues to operation 1510 where a 2D located hole is offset within the 3D mesh from which the virtual photograph is taken, for example, as shown with reference to FIG. 11a. This may be offset in a direction vertical from the portion of the mesh that corresponds to its segment, e.g., offset vertically from the direction of the floor or the ceiling. In some embodiments, the offset itself is in two dimensions, in some embodiments, the offset is in three dimensions.

Figure 16:
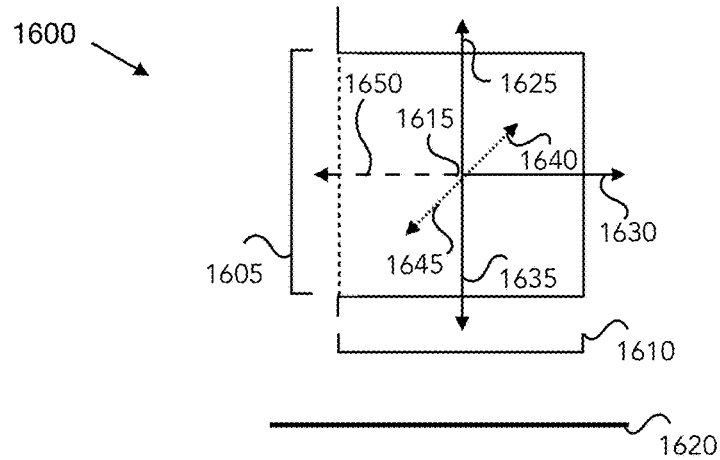
FIG. 16 illustrates an offset hole.

FIG. 16 illustrates a side view of an offset hole 1600, the hole, e.g., 1005, offset 1610 at an angle vertical from the floor 1620. Alternate embodiments may have the offset in a different direction than from the floor or ceiling. At operation 1515, some location within the offset is determined. In some embodiments, the center of the offset area 1615 is determined. The offset from the hole 1610 may be the same length 1605 as the hole itself; the offset may be a set offset, or the offset may be a different length. Once the middle of the offset has been determined, at operation 1510, rays are cast from the center of the offset area in a number of directions. For example, rays may be cast 1520 in the 6 cardinal directions 1625, 1630, 1635, 1640, 1645, 1650, e.g., the cardinal directions in 3D space. In some embodiments, fewer or more than 6 rays are cast. In some embodiments, the rays are cast in directions other than the cardinal directions. In some embodiments, these rays are cast at a length such that they should be able to intersect with a feature on the room surface that they are representing, if one exists. For example, a ray cast from the hole 1105b should be long enough to hit the shelf shown at 1105a. The ray should not be long enough to hit a far room surface. At decision point 1525, the number of rays that hit a back side of a face in the mesh are calculated. Front facing intersections are ignored. If zero or one ray hits a back side of a face in the 3D mesh, then at operation 1530 the hole is classified as an artifact, in that it does not represent an actual hole, but rather indicates an error in the mesh, as one ray may hit the ceiling or the floor in an artifact. Then, at operation 1535, the method stops. If, at decision point 1535, more than one ray hits a back side of a 3D mesh face, then the apparent hole is determined to be a real hole, and thus in need of classification. The method continues at at operation 1540, where the floor of the virtual 2D picture is determined, which will be used to determine if the hole is a door, as doors are assumed, in some embodiments, to start at floor level. One embodiment of determining the floor is shown with reference to FIG. 17 and the surrounding text. In some embodiments, the floor determination may have previously been made. Other embodiments may make different assumptions about door placement. At decision point 1545 it is determined if one of the boundaries of the hole is on the floor, or close enough to the floor. This may be performed by checking the lowest Z value of the hole against the Z value of a determined floor (such as described with reference to FIG. 17). There may be an allowable offset from the floor Z level, such that a hole that is up to a predetermined amount higher than a floor Z value is also considered "on the floor". If the hole is not at floor level, then at operation 1565, the hole is classified as a window. An example of a window in a virtual 2D picture may be found in FIG. 12 at 1210. The window classification may have other parameters, such as size, orientation, etc. to determine if the hole is a window. At decision point 1545, if it is determined that one of the boundaries of the hole is on the floor, then at decision point 1550, it is determined if the hole is wide enough to be a door—the door width. What the door width should be may be determined by a constant, by an analysis that takes into account the location of the hole, the type of room the hole is in, etc. If the hole is wide enough, then at operation 1555, the hole is classified as a door, then at operation 1560 the method stops. In some embodiments, the hole also may be checked if the hole is high enough to be a door. In some embodiments other parameters are included. FIG. 12 at 1205 shows an example of a hole that may be classified as a door. Notice that the hole on or close enough to the ground, and tall and wide enough to be a door. At decision point 1550, if it is determined that the hole is not wide enough for a door, then at operation 1565 then the hole is classified as a window and at operation 1570, the method stops.

Figure 17:
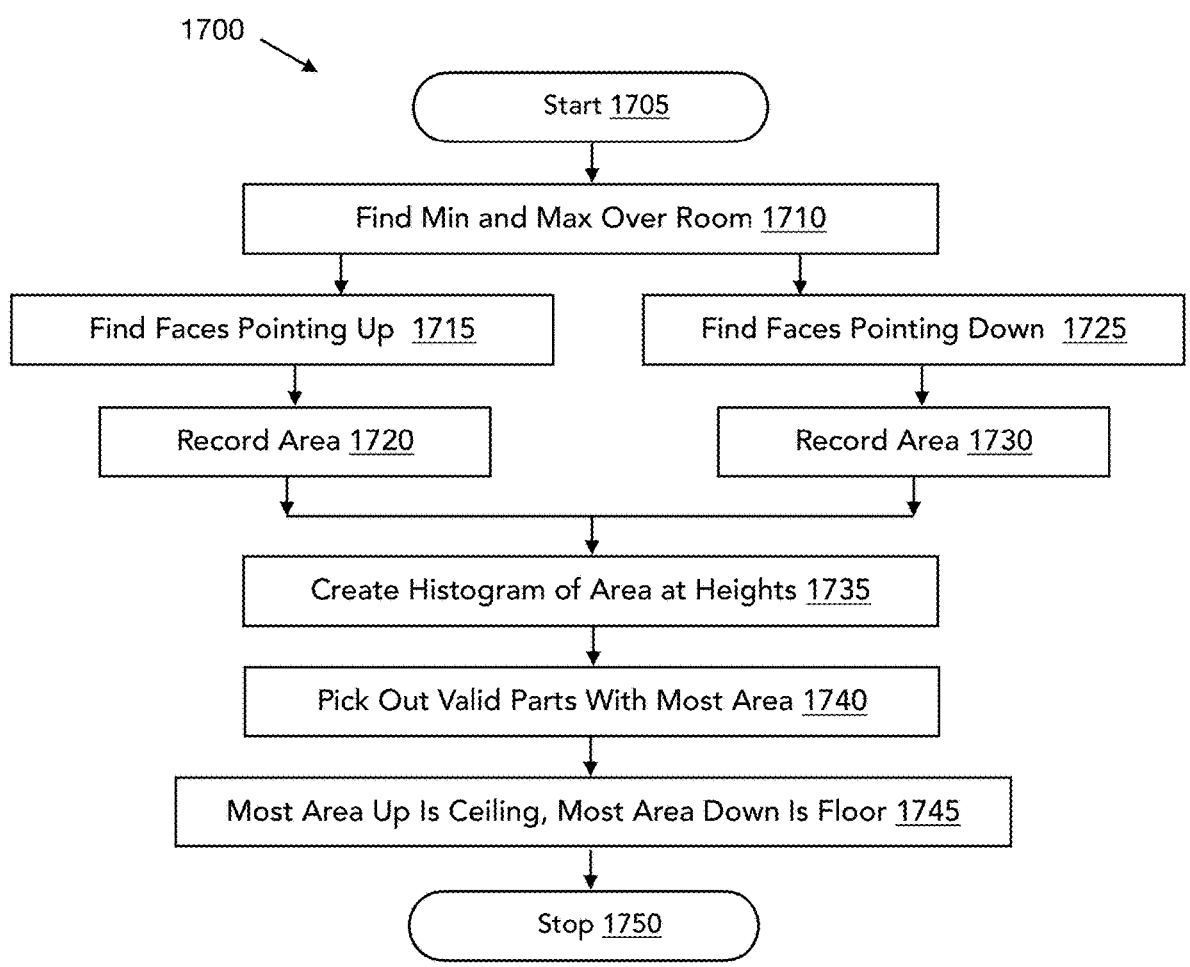
FIG. 17 illustrates an example of a method for determining if a hole is on the ground.

FIG. 17 illustrates an example of a method 1700 for determining if a hole is on the ground or the ceiling. This may be used to determine the y value of a virtual picture that will be taken within a mesh, e.g., operation 825 at FIG. 8. It may also be used for classifying a door or window, as described, e.g. with reference to FIG. 1 and the surrounding text. In various embodiments, the method 1700 may be performed by a processor 520 within a scanner, e.g., 630, a distributed system, a single processor, a single controller, etc. Various alternative arrangements and methods of determining if a hole is located at ground level will be obvious.

The method begins at operation 1705, and then continues to operation 1710 where minimum and maximum Z values are determined using a 3D mesh that represents the room (e.g. FIG. 9) from which the segment with this hole was taken. (e.g., see 820 in FIG. 8 and the surrounding text). The faces of the 3D mesh are oriented to gravity, with some having an up orientation −Z+, and some having a down orientation −Z−. At operation 1715, the individual faces in the mesh pointing up, e.g., with a Z+ value between the min and max Z values are determined. At operation 1720, the area of those faces discovered in operation 1715 and their Z value are recorded. At operation 1725, the faces in the mesh pointing down (where the normal vector of a face is aligned with gravity) between the min and max Z values are determined. At operation 1730, the areas of the faces discovered at operation 1715 and their Z value are recorded. At operation 1735, a histogram of the area by Z value is created. The number of the bars in the histogram may be determined by any number of methods. There may be a fixed number of bars, the number of bars may be related to the size of the maximum Z and minimum Z values, etc. At operation 1740, the tallest bar (e.g., the bars with the most area) in the up direction (Z+) and the down direction (Z−) are determined. At operation 1745, the highest histogram bar in the Z+ value is determined to be the ceiling. Similarly, the highest Z− value histogram bar is determined to be the floor. This can be thought of conceptually as the ceiling and floor being captured in the mesh, as opposed to the space in the interior of a room, which can generally be thought of as empty. Then, at operation 1750, the method stops.

It should be apparent from the foregoing description that various example embodiments of the invention may be implemented in hardware or firmware. Furthermore, various example embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, and the like represent various processes which may be substantially represented in machine readable media and so executed by a computer or processor, whether or not such computer or processor is explicitly shown.

Although the various example embodiments have been described in detail with particular reference to certain example aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

I claim:

1. A method performed by a processor for locating features within a 3D mesh, the method comprising:
   locating, within a memory associated with the processor, a 2D segment correlated with a 3D mesh representing a surface of a room;
   determining a virtual picture bottom and a virtual picture top of the 3D mesh;
   using the virtual picture bottom and virtual picture top, taking a virtual 2D picture of the 3D mesh along the 2D segment;
   within the virtual 2D picture:

a) finding a hole, b) determining a width of the hole, and c) when the hole intersects the virtual picture bottom and when the hole is at least as wide as a predetermined door width then determine a structural feature for the hole.

2. The method of claim 1, wherein when the hole does not intersect the virtual picture bottom or when the hole is not at least as wide as the predetermined door width, then classifying the hole as a window.

3. The method of claim 1, wherein the 3D mesh is created using 3D depth scanner and a 2D camera working in tandem.

4. The method of claim 1, further comprising determining whether the hole is not an artifact.

5. The method of claim 4, wherein determining when the hole is not an artifact comprises:

finding a location of the hole within the 3D mesh;

offsetting the location of the hole within the 3D mesh, creating a hole offset;

casting rays from a middle of the hole offset into the 3D mesh; and when the cast rays have hit a back side of more than one face then determining that the hole is not an artifact.

6. The method of claim 1, wherein a surface of a room comprises a floor, a ceiling, or a wall.

7. The method of claim 1, wherein taking a virtual 2D picture of the 3D mesh along the 2D segment comprises taking a virtual picture with a y axis running from the virtual picture bottom to the virtual picture top.

8. The method of claim 7, further comprising: locating faces in the 3D mesh whose normal vector is opposite to gravity, recording area of the faces in the 3D mesh whose normal vector is opposite to gravity as an up area, locating faces in the 3D mesh whose normal vector is aligned with gravity, and recording area of the faces in the 3D mesh whose normal vector is aligned with gravity as a down area.

9. The method of claim 8, further comprising creating a histogram of the up area at different heights, and creating a histogram of the down area at different heights.

10. The method of claim 8, further comprising finding height of a tallest histogram in the down area and declaring it as a determined floor.

11. The method of claim 1, wherein determining a virtual picture bottom and a virtual picture top of the 3D mesh comprises finding a minimum value of the room in Z as the virtual picture bottom and finding a maximum value of the 3D mesh in Z as the virtual picture top. further comprising finding faces pointing up, recording area of the faces pointing up, finding faces pointing down, and recording area of the faces pointing down.

12. A system for locating features within a 3D mesh, the system comprising:

a processor in communication with a memory storing a 3D mesh, the processor being configured to:

locate, within the memory, a 2D segment correlated with a 3D mesh representing a surface of a room;

determine a virtual picture bottom and a virtual picture top of the 3D mesh;

use the virtual picture bottom and virtual picture top, taking a virtual 2D picture of the 3D mesh along the 2D segment;

take a virtual 2D picture of the 3D mesh along the 2D segment;

within the virtual 2D picture, finding a hole;

determine hole width; and when the hole intersects the virtual picture bottom and when the hole width is greater or equal to a door width then classifying the hole as a door.

13. The system of claim 12, further comprising determining when the hole is not an artifact.

14. The system of claim 13, wherein determining when the hole is not an artifact comprises:

finding a location of the hole within the 3D mesh;

offsetting the location of the hole within the 3D mesh, creating a hole offset;

casting rays from a middle of the hole offset into the 3D mesh; and when the cast rays have hit a back side of more than one face then determining that the hole is not an artifact.

15. The system of claim 14, wherein casting rays comprises casting six rays.

16. The system of claim 15, wherein the six rays are cast in six cardinal directions.

17. A non-transitory machine-readable storage medium encoded with instructions for execution by a processor for locating features within a 3D mesh, the non-transitory machine-readable storage medium comprising:

instructions for locating, by the processor, within a memory associated with the processor, a 2D segment correlated with a 3D mesh representing a surface of a room;

instructions for determining a virtual picture bottom and a virtual picture top of the 3D mesh;

instructions for using the virtual picture bottom and virtual picture top to take a virtual 2D picture of the 3D mesh along the 2D segment;

instructions for, within the virtual 2D picture, finding a hole;

instructions for determining hole width, and instructions for, when the hole intersects the vertical virtual picture bottom and when the hole is at least as wide as a door width then classifying the hole as a door.

18. The non-transitory machine-readable storage medium of claim 17 further comprising determining when the hole is not an artifact.

19. The non-transitory machine-readable storage medium of claim 18 wherein determining when the hole is not an artifact comprises:

instructions for finding a location of the hole within the 3D mesh;

instructions for offsetting the location of the hole within the 3D mesh, creating a hole offset;

instructions for casting rays from a middle of the hole offset into the 3D mesh;

instructions for, when the cast rays have hit a back side of one or fewer faces then determining that the hole is not an artifact; and instructions for, when the cat rays have hit the back side of more than one face then determining that the hole is an artifact.

20. The non-transitory machine-readable storage medium of claim 19 further comprising instructions for classifying the hole as a window when the hole does not intersect the virtual picture bottom or when the hole is not at least as wide as the door width.

* * * * *